Figure 1:
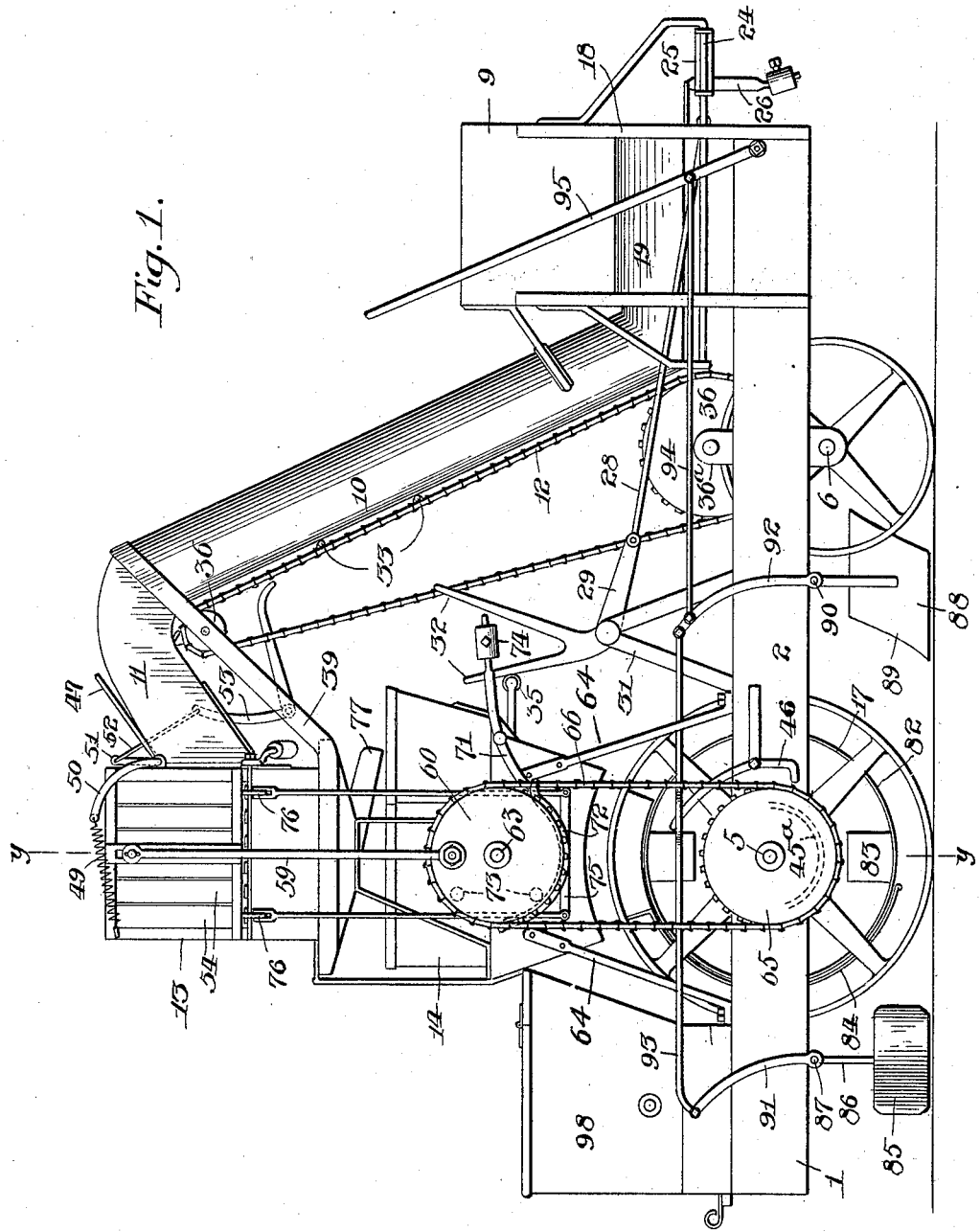

No. 635,057. Patented Oct. 17, 1899.
W. O'NEILL.
POTATO PLANTER.
(Application filed July 30, 1898.)

(No Model.) 4 Sheets—Sheet 1.

WITNESSES:
Walter C. Pusey
N. L. Cheeseman

INVENTOR
Wesley O'Neill,
BY John R. Nolan
ATTORNEY.

THE NORRIS PETERS CO., PHOTO-LITHO., WASHINGTON, D. C.

No. 635,057. Patented Oct. 17, 1899.
W. O'NEILL.
POTATO PLANTER.
(Application filed July 30, 1898.)
(No Model.) 4 Sheets—Sheet 2.
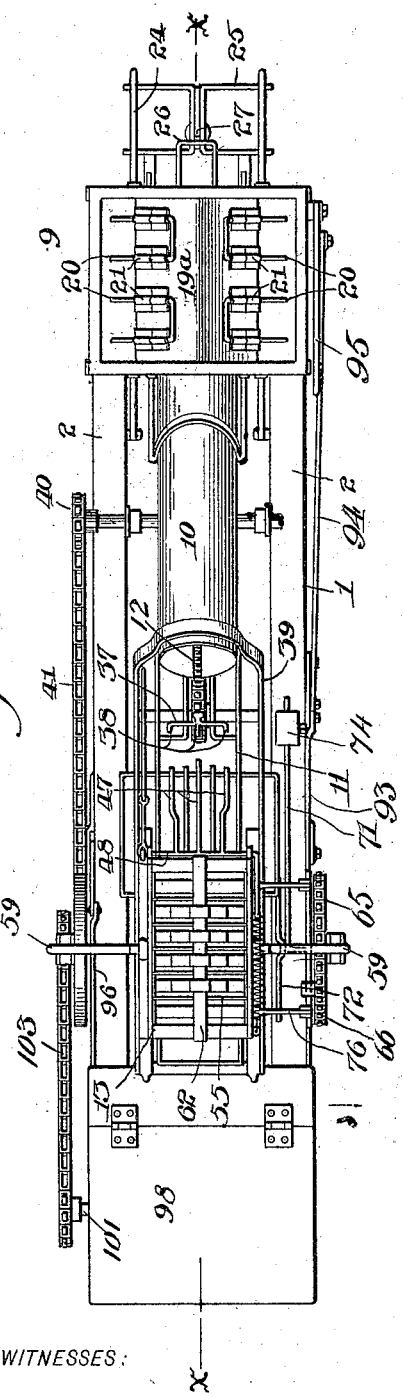
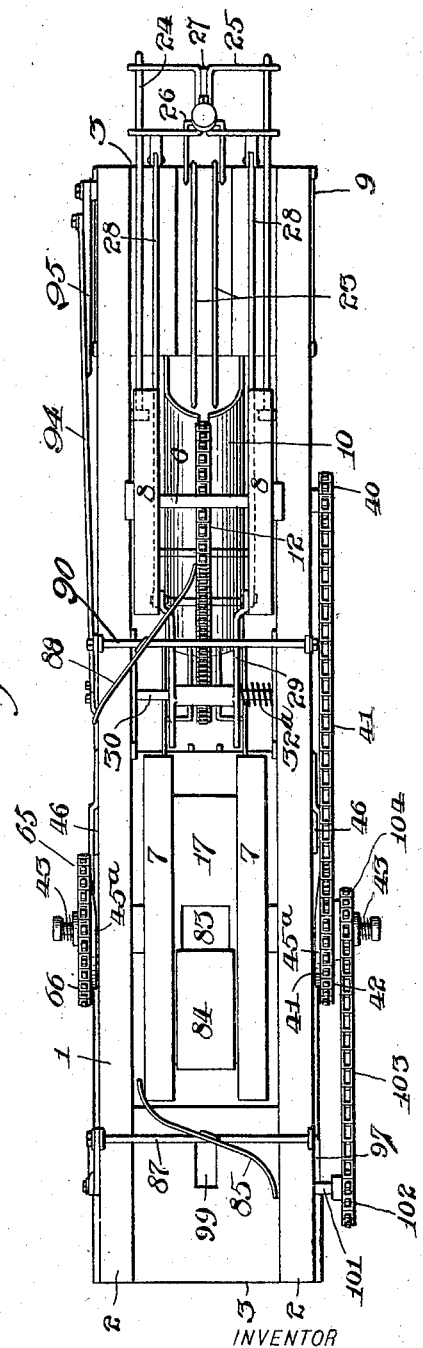
WITNESSES:
Walter C. Pusey.
H. L. Cheeseman.
INVENTOR
Wesley O'Neill,
BY John R. Nolan
ATTORNEY.

No. 635,057. Patented Oct. 17, 1899.
W. O'NEILL.
POTATO PLANTER.
(Application filed July 30, 1898.)
(No Model.) 4 Sheets—Sheet 3.
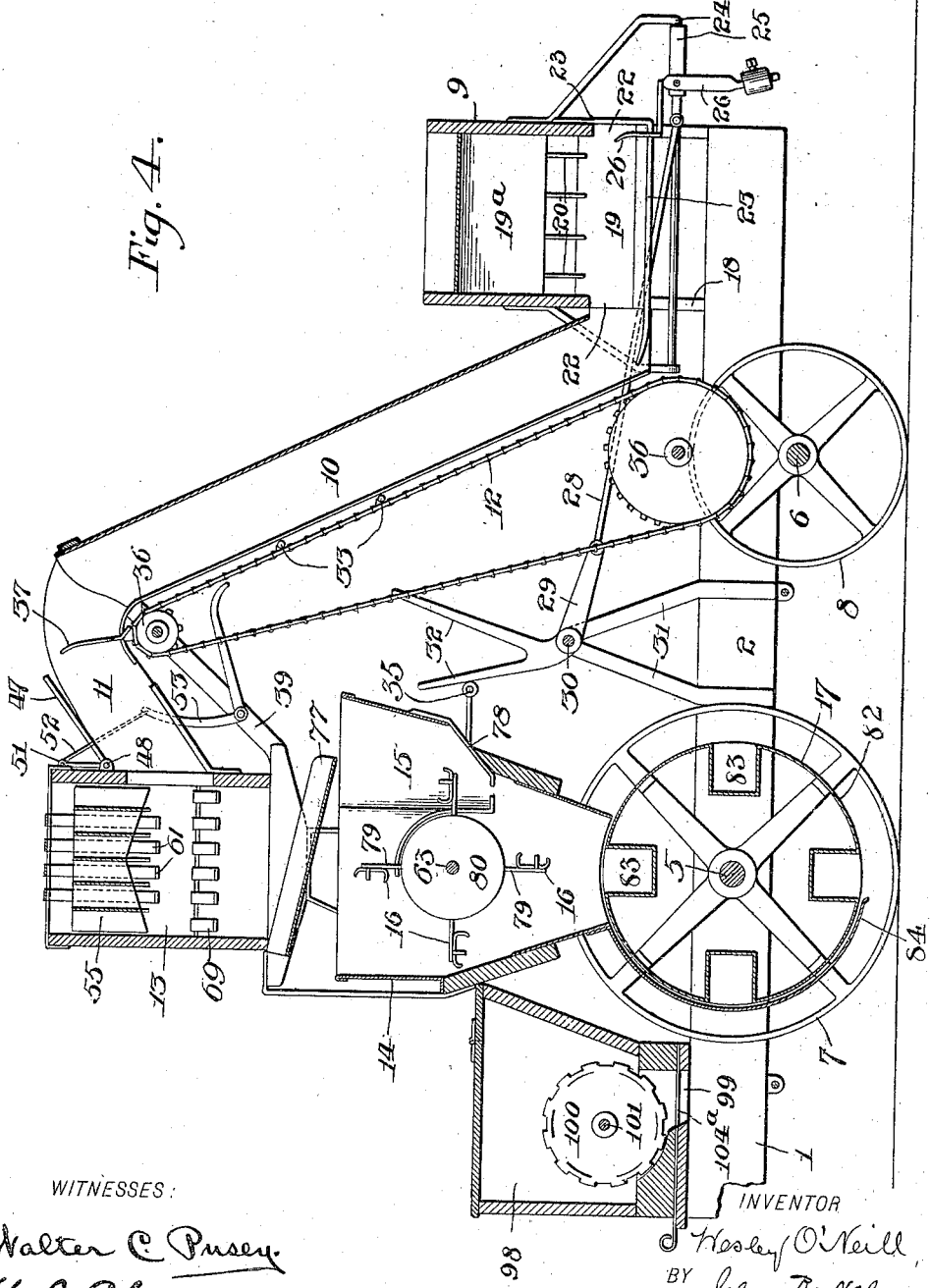
WITNESSES:
Walter C. Pusey.
H. L. Cheeseman
INVENTOR
Wesley O'Neill,
BY John R. Nolan
ATTORNEY.

No. 635,057. Patented Oct. 17, 1899.
W. O'NEILL.
POTATO PLANTER.
(Application filed July 30, 1898.)
(No Model.) 4 Sheets—Sheet 4.
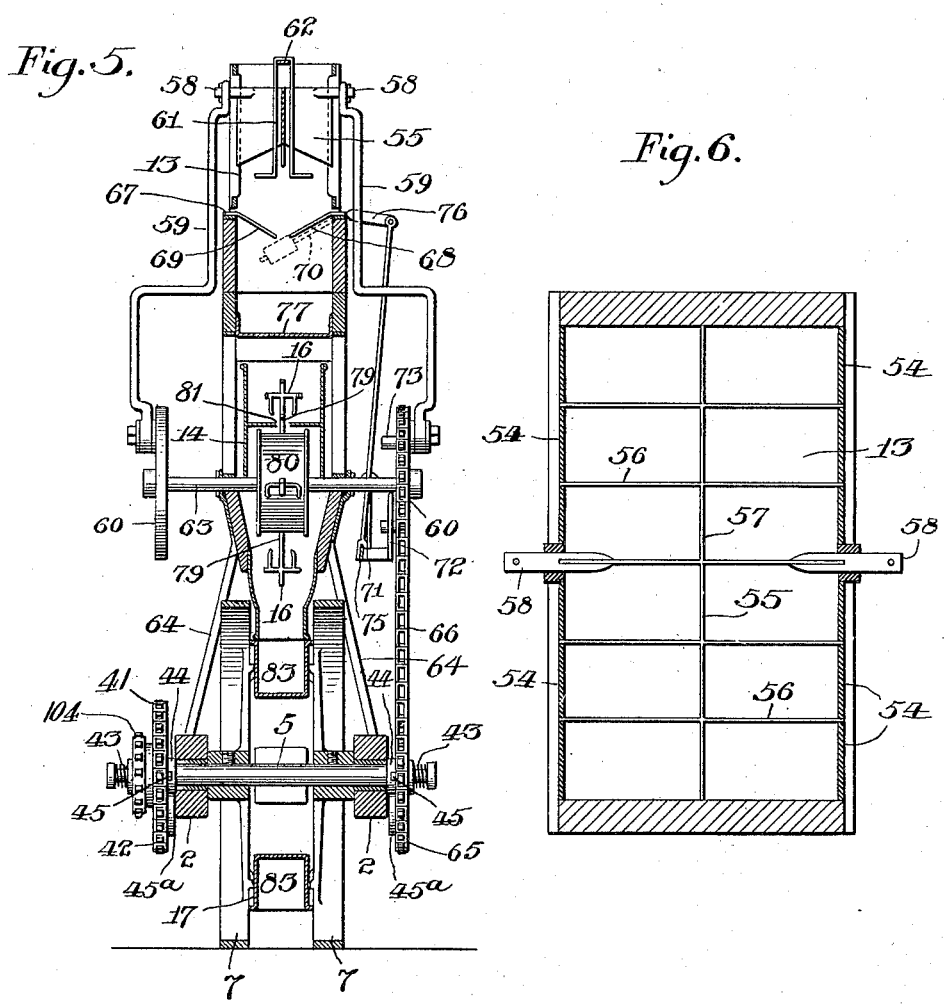
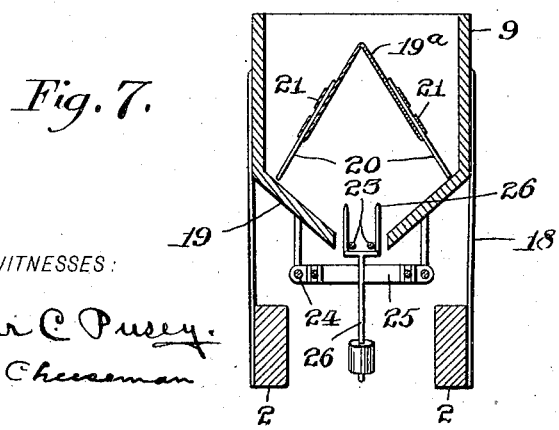
WITNESSES:
Walter C. Pusey.
H. L. Cheeseman
INVENTOR
Wesley O'Neill
BY John R. Nolan
ATTORNEY.
THE NORRIS PETERS CO., PHOTO-LITHO., WASHINGTON, D. C.

UNITED STATES PATENT OFFICE.

WESLEY O'NEILL, OF RUSSELLVILLE, PENNSYLVANIA.

POTATO-PLANTER.

SPECIFICATION forming part of Letters Patent No. 635,057, dated October 17, 1899.

Application filed July 30, 1898. Serial No. 687,270. (No model.)

*To all whom it may concern:*

Be it known that I, WESLEY O'NEILL, a citizen of the United States, residing at Russellville, in the county of Chester and State of Pennsylvania, have invented certain new and useful Improvements in Potato-Planters, of which the following is a full, clear, and exact description, reference being had to the accompanying drawings, forming a part of this specification.

This invention relates to that class of potato-planters by which the potatoes are cut into suitable pieces and deposited at intervals apart in a furrow, my object herein being to provide a simple and efficient construction whereby the furrow is opened, the potatoes carried successively from a suitable source of supply to novel cutting mechanism, and thereby cut into seed-pieces, then such pieces transferred to a feed-wheel, and thereby dropped at regular intervals apart into the furrow, and the earth then covered over such pieces, the several operations being automatically performed during the traverse of the apparatus.

Accordingly the invention embodies various novel features of construction and organization of parts, which will be hereinafter described and claimed.

In the drawings, Figure 1 is a side elevation of the machine. Fig. 2 is a plan thereof. Fig. 3 is a view of the under side of the same. Fig. 4 is a longitudinal vertical section as on the line $x\,x$ of Fig. 2. Fig. 5 is a transverse vertical section as on the line $y\,y$ of Fig. 1. Fig. 6 is a horizontal section, enlarged, through the cutter-box, showing the guides for the cutter-head. Fig. 7 is a transverse vertical section through the supply-hopper.

Numeral 1 designates the frame of the machine, comprising the longitudinal beams 2 and the cross-bars 3. On the beams are suitably-arranged boxes or bearings for axles 5 6, on which are fixed the carrying-wheels 7 8, respectively. The wheels are preferably arranged in pairs, those in the rear being considerably smaller than the forward wheels.

Supported on the frame are a hopper 9, in which the whole potatoes are contained, an inclined cylindrical casing 10, in which they are successively delivered from the hopper, an overhanging chute 11, to which the potatoes in the casing are carried by an endless conveyer 12, a cutting device 13, to which the potatoes in the chute are directed and by which device they are cut into pieces, an underlying hopper 14, provided with a chambered portion 15 to receive such pieces, and a series of revolving forks 16 to transfer the pieces from the chamber to the hopper 14, whence they are directed to a pocketed feed-wheel 17 on the forward axle, whereby during the rotation of the carrying-wheels such pieces are deposited at regular intervals in the furrow, as will hereinafter appear.

The supply-hopper 9 is supported by uprights 18 at the rear of the frame and is provided with an open tapering bottom 19, by way of which the potatoes contained in the hopper are delivered to an underlying reciprocating transfer mechanism below described. Within the hopper is arranged an inverted-V-shaped partition 19ª, the walls of which lie somewhat above the oppositely-inclined bottom sections of the hopper, whereby the potatoes fed to the hopper are directed to the opposite sides of the latter and their free downward passage insured. Each side of the partition is provided with one or more slides 20, which may be readily depressed or raised by the attendant in a manner to close or open the communication between either or both compartments of the hopper and the discharge-opening, as desired. The slides are preferably U-shaped wires fitted to guides 21 on the sides of the partition.

The ends of the hopper are provided with openings or passages 22, which form, in effect, a continuation of the opening in the bottom of the hopper. Within the latter opening are longitudinally-arranged parallel bars 23, upon which the potatoes are supported. These bars are bent upward at their rearward ends and secured to the adjacent end of the hopper, so as partially to close the end opening, while the opposite ends of the bars extend forwardly beyond the hopper to the mouth of the inclined casing.

Below the hopper is arranged a rectangular guide-frame 24, comprising two longitudinal bars secured by depending arms to the respective ends of the hopper. On these bars are fitted and guided a cross-head 25, which is movable to and fro. In the cross-head is pivoted a vertical lever 26, the upper arm of which is bifurcated or forked, while the lower or depending arm is equipped with a counterpoise which maintains the fork normally raised. This fork of the lever 26 straddles the bars 23 and extends into the hopper, so that when the cross-head 25 is moved forward the fork will travel within the bottom opening, and thus advance the opposing potatoes therein to the inclined casing at the forward end of the hopper. A stop 27 is provided in rear of the lever to prevent the backward movement of the fork when the cross-head is moved forward, yet permit the fork to swing downward against the action of the potatoes in the hopper when the cross-head is retracted. The cross-head 25 is connected by rods 28 with suitably-arranged arms 29 on a rock-shaft 30, whereby when said shaft is actuated the reciprocation of the cross-head is attained. The rock-shaft has its bearings in bars or brackets 31, bolted to the main frame.

The cross-head is maintained normally retracted, preferably by the action of a torsional spring 32$^a$ on the rock-shaft 30, the forward movement being imparted to the cross-head at predetermined intervals by the impact upon suitably-disposed arms 32 on the rock-shaft of traveling tappet-studs 33. The forward arm 32 of the cross-head coacts with a stud 35 to limit the rearward movement of the cross-head 25. The tappet-studs 33 comprise cross-bars affixed to the endless sprocket-chain 12, which passes around sprocket-wheels 36, located near the respective ends of the casing 10, whereby the chain in its traverse moves adjacent to and parallel with the forward side of the casing. The front side of the casing 10 is longitudinally slotted and the chain 12 is provided with an outwardly-projecting arm 37, which is designed during the movement of the chain to pass below the supporting-arms at the lower end of the casing, thence into the opening and along the interior of the casing, so as to raise the potato at the mouth of the latter and carry it upward to the chute, thereupon freeing the potato and permitting it to pass to the cutter-box 13. The arm 37 is preferably provided with a series of prongs or fingers 38, which afford a broad bearing-surface for the potato and insure its elevation. During each revolution of the chain 12 a potato is taken up from the mouth of the casing, the studs 33 preparatory to the return of the lifting-arm to the mouth coacting with the arms 32 on the rock-shaft to effect the advancement of the cross-head 25 and its transfer-fork 26 for the purpose stated. The shaft of the lower sprocket-wheel 36 is mounted in boxes 36$^a$ on the main frame, while that of the upper wheel 36 is journaled in brace-bars 39, interposed between the casing and the cutter-box 13. The lower shaft is driven from the forward axle 5 by suitable gearing. In the present instance it is provided with a sprocket-wheel 40, which is connected with a sprocket-wheel 42 on the axle 5 by a chain 41, which latter wheel 42 is so arranged that it may be connected with or disconnected from the axle 5 at will for the purpose of throwing the conveyer and hopper feed devices into and out of action, as desired, during the travel of the apparatus.

The wheel 42 is mounted on the axle 5, so as to be laterally movable thereon. A spring 43, interposed between the outer face of the wheel and a projection on the axle, tends to force the wheel against a collar 44 on the axle, which collar is notched or recessed to receive corresponding teeth or studs 45 on the hub of the wheel, thus locking the wheel to the axle. On the inner face of the wheel 42 is a cam 45$^a$, while on the adjacent side of the supporting-frame is a lever 46, which may be moved into the path of the cam in such manner that during the rotation of the wheel the cam will bear against the lever and, perforce, shift the wheel outward from engagement with the collar, in which case the wheel will be unaffected by the rotation of the axle. The lever is operated by certain lever-and-link devices, which will be hereinafter explained.

The chute 11 above referred to is preferably entirely open on its upper side, so that access may be readily had to the interior thereof, while the bottom of the chute comprises a grating, through which the arm 37 may freely pass in its travel. The upper end of the chute 11 is substantially a continuation of the casing 10, the lower end thereof communicating with and being affixed to the cutter-box 13. There is a series of swinging prongs 47 at the entrance to this box, as shown, which prongs are designed to strike against the potatoes successively in the chute and insure their delivery into the box. The prongs depend from a shaft 48 on the end of the box and are held normally raised by means of a retracting-spring 49, secured to the side of the box and to an arm 50 on one end of the pivot-shaft 48. On the opposite end of this shaft is an arm 51, which is connected by means of a link 52 with one arm of a crank-lever 53, that is fulcrumed on the adjacent brace-bar 39, the other arm of the lever extending into the path of the tappets 33 on the conveyer. Hence the tappets during their downward travel impinge against said arm and effect the operation of the striker-prongs. When the tappets escape the arm, the prongs are normally raised in position for a succeeding operation.

The cutter-box 13 comprises a rectangular structure provided with parallel vertical plates 54, which afford between them lateral guides for a vertically-reciprocating cutter-head 55. This head embodies a series of transverse knives 56, connected by a central longitudinal knife 57, the whole being beveled on their lower edges to provide a multiplicity of cutting members. The transverse knives are fitted to and guided in the lateral guideways between the plates, one of such knives being provided with outwardly-projecting studs 58, which extend through the adjacent guides. These studs are connected by means of rods 59 with crank-wheels 60 on the respective sides of the machine, whereby during the rotation of said wheels the cutter-head is vertically reciprocated in a manner to sever the potatoes into pieces fit for planting. The pieces which adhere to the knives are cleared therefrom in the upward strokes of the latter by the action upon such pieces of a series of U-shaped strippers 61, between the limbs of which rise the knives. These strippers depend from a longitudinal supporting-bar 62 on the cutter-box.

The crank-wheels 60 are mounted on a shaft 63, that has its bearings in the walls of the hopper 14, which hopper is supported directly above the carrying-wheels 7 by means of brace-rods 64. One of the crank-wheels 60 is toothed similarly to a sprocket-wheel and is geared with a sprocket-wheel 65 on the axle 5 by means of a chain 66, and thereby driven during the traverse of the apparatus. Wheel 65 is mounted on the axle 5 similarly to the wheel 42, above described, so as to be movable into and out of action simultaneously therewith, as below stated.

The cutter-box 13 is provided with a floor or grating 67, constructed and arranged to permit the passage of the cutter-head therethrough. This grating supports the potatoes that are delivered from the chute to the end that in the descent of the cutter-head the potatoes will be severed, as above described. The grating represented in the drawings, Fig. 5, comprises two sections 68 69, which incline toward the center of the machine, one of which sections, 68, is hinged to the side of the frame, so that it may be swung downward at intervals to permit the discharge of the seed-pieces as they are cut. On the hinge-pin of the section 68 is a weighted arm 70, which serves to open said section when the latter is freed from the action of certain cam-and-lever devices under the control of one of the crank-wheels. These devices are of the following construction: 71 is a lever fulcrumed to a bracket on the side of the hopper 14, one of the arms of which lever is provided with a segmental cam 72, that lies adjacent to one of the crank-wheels 60 and in the path of the tappet-studs 73 on the latter, the other arm of the lever being provided with a counterpoise 74. Pivoted to the cam-bearing arm of the lever is a centrally-pivoted lever 75, the arms of which are connected with outwardly-projecting arms 76 on the hinged section 68. Hence during the rotation of the crank-wheel the cam-lever is oscillated and the grate-section opened and closed—that is, in a partial revolution of said wheel the tappet-studs thereon coact with the cam-lever to depress the same and raise the grate-section, while in the remainder of the revolution the tappet-studs are disengaged from such lever, the grate thus being opened by the action of the counterpoise-lever.

Below the cutter-box is a chute 77, which receives the seed-pieces when the grate-section 68 is opened and discharges such pieces into the chamber 15 in the forward upper part of the hopper 14. There is in the bottom of this chamber a grating 78, upon which the seed-pieces fall, and are thereby supported in the path of a series of rotating transfer-forks 16, which in their traverse successively pick up the said pieces and transfer them to the hopper 14, whence they drop upon the periphery of the pocketed feed-wheel 17 above referred to. The transfer-forks are formed on or secured to the free ends of a series of radial arms 79 on a wheel 80, which is fixed to and rotated by the shaft 63. The inner wall of the chamber is slotted, as at 81, for the passage of the revolving arms.

The pocketed feed-wheel 17 is fixed between the carrying-wheels 7. It comprises a ring 82, in the periphery of which are formed a series of pockets or chambers 83 for the reception of the seed-pieces transferred to the hopper 14, as above stated. Secured to the forward side of this hopper is a depending curved guard-plate 84, which lies adjacent to the periphery of the feed-wheel, so as to prevent the discharge of the seed-pieces from the wheel until the pockets are in the lowermost position. Hence the pieces are dropped at regular intervals into the furrow. Preparatory to dropping the pieces the furrow is cleared by an opener 85, which is composed of a curved blade on the lower end of a rod 86, depending from a rock-shaft 87, mounted near the forward end of the main frame. In rear of the feed-wheel is a coverer 88, which throws the earth upon the pieces in the furrow. This coverer also comprises a suitably-curved member 89, depending from a rock-shaft 90 on the main frame. The shafts 87 and 90 are provided with upwardly-extending arms 91 92, respectively, which are connected by a link 93, the rearward arm being also connected by means of a link 94 with a hand-lever 95, by the operation of which the opener and coverer may be raised and lowered, as desired.

The upper end of the lever 46 above referred to extends into a slot in the link 93, Fig. 1, while the corresponding lever on the opposite side of the frame is connected by means of a link 96 with an arm 97 on the rock-shaft 87. Hence when the hand-lever 95 is operated to raise the opener and coverer the levers 46 bear against the opposing sprocket-wheels 42 and 65, respectively, and force them laterally outward from engagement with the clutch members on the axle to render them inactive, as above stated.

On the forward end of the supporting-frame is preferably arranged a phosphate-distributer 98, by means of which the fertilizer is fed to the furrow in advance of the seed-pieces. This distributer comprises a box having a discharge-opening 99 in the bottom thereof, through which the phosphate is fed by a rotating corrugated wheel 100, mounted within the box on a shaft 101. One end of this shaft extends outwardly and is provided with a sprocket-wheel 102, which is connected by means of a sprocket-chain 103 with a similar wheel 104 on the hub or side of the wheel 42, whereby during the rotation of the latter wheel the feed-wheel 100 is rotated. It will be obvious that when the wheel 42 is thrown out of action the wheel 100 is idle. A slide or gate 104ª is provided to close the discharge-opening 99 when desired.

While I have hereinbefore described my invention in a desirable and practicable form, yet I do not limit myself to the particular construction, as the same may be modified in many respects without departing from the spirit of the invention.

I claim—

1. The combination, with the hopper having an open tapering or inclined bottom, of an inverted-V-shaped partition in said hopper, and slides fitted to guides in the respective walls of said partition and independently movable toward and from said bottom.

2. The combination, with the hopper having an open tapering or inclined bottom, an inverted-V-shaped partition in said hopper, and independently-movable slides in the respective walls of said partition, of a longitudinally-reciprocative cross-head below the opening in said bottom, a guide for said cross-head, and means on said cross-head extending into the hopper and adapted to expel the contents thereof.

3. The combination, with a supply-hopper, of an underlying cross-head, a guide therefor, a counterpoised lever in said head adapted to expel the contents of the hopper, and means for reciprocating said cross-head.

4. The combination, with a supply-hopper, of an underlying cross-head, a guide therefor, a counterpoised lever in said head adapted to expel the contents of the hopper, a rock-shaft, an arm thereon, connections between said arm and the cross-head, and means for actuating said shaft.

5. The combination, with a supply-hopper, of an underlying cross-head, a guide therefor, a counterpoised lever in said head adapted to expel the contents of the hopper, a rock-shaft, a spring to maintain it in normal position, operative connections between said shaft and the cross-head, and means for actuating said shaft.

6. The combination, with the supply-hopper, the cutter-box, the cutter-head therein, and means for actuating said head, of conveyer mechanism between said hopper and box, and means for feeding potatoes from the hopper to said mechanism.

7. The combination, with the supply-hopper, the casing, the chute, and the cutter mechanism, of means for feeding the contents of the hopper to the casing, a conveyer to carry such contents to the chute, and means for operating said conveyer.

8. The combination, with the supply-hopper, the casing, the chute, and the cutter mechanism, of means for feeding the contents of the hopper to the casing, a conveyer to carry such contents to the chute, means for operating said conveyer, and striker devices at the entrance to the cutter mechanism.

9. The combination, with the supply-hopper and the casing, of a reciprocating transfer device adjacent to the hopper, a rock-shaft, connections between said shaft and the transfer device, a conveyer having lifting means adapted to travel within the casing, and coacting means on said rock-shaft and conveyer.

10. The combination, with the supply-hopper, the casing, the chute, and the cutter mechanism, of a reciprocating transfer device adjacent to the hopper, a rock-shaft, connections between said shaft and the transfer device, a conveyer having lifting means adapted to travel within the casing, and coacting means on said rock-shaft and conveyer.

11. The combination, with the supply-hopper, the casing, the chute, and the cutter mechanism, of a reciprocating transfer device adjacent to the hopper, a rock-shaft, connections between said shaft and the transfer device, a conveyer having lifting means adapted to travel within the casing, coacting means on said rock-shaft and conveyer, a striker device at the entrance to the cutter mechanism, and a lever connected with said device and adapted to be actuated by the conveyer.

12. The combination, with the supply-hopper, the casing, the chute, and the cutter mechanism, of a conveyer having lifting means adapted to travel within the casing, a hinged striker at the entrance to the cutter mechanism, a spring to maintain said striker normally raised, a lever connected with said striker, and means on the conveyer to actuate said lever.

13. The combination with the cutter-box provided with parallel vertical plates between the adjacent edges of which are formed lateral guideways, of a cutter-head contained within said box and comprising a series of transverse knives beveled on their lower edges and fitted to said ways, a longitudinal knife connecting said transverse knives, one of said latter knives being provided with studs which extend through the adjacent guideways, and means for reciprocating said cutter-head.

14. The combination, with the cutter-box, the cutter-head therein, and means for reciprocating said head, of the strippers adjacent to the path of said head.

15. The combination, with the cutter-box, the cutter-head therein comprising transverse and longitudinal knives, and means for reciprocating said head, of the fixed U-shaped strippers between the limbs of which said knives reciprocate.

16. The combination, with the cutter-box, its cutters, and means for reciprocating the same, of the hinged-floor section, and means for swinging said section.

17. The combination, with the cutter-box, its cutters, and means for reciprocating said cutters, of the hinged-floor section, the counterpoised arm thereon, the cam-lever, means for operating the same, and connections between said lever and the floor-section.

18. The combination, with the cutter-box, its cutters, means, including a crank-wheel, for reciprocating said cutters, means for driving said wheel, a hinged floor in said box, means to maintain it in a normal position, a cam-lever, tappets on said wheel adapted to coact with said lever, and connections between said lever and the hinged floor.

19. The combination, with the supporting-frame, and its carrying-wheels, of the pocketed feed-wheel, the overlying hopper, the chamber therein, the rotatable transfer device in said hopper adapted to enter said chamber, cutter mechanism, and connections between the same and said chamber.

20. The combination, with the supporting-frame, and its carrying-wheels, of the pocketed feed-wheel, the overlying hopper, the chamber therein, the rotatable transfer device in said hopper adapted to enter said chamber, a cutter-box, cutters therein, means for operating said cutters, a movable floor in said box, means for moving the same, and means affording communication between said box and the chamber.

21. The combination, with the supporting-frame and its carrying-wheels, of the pocketed feed-wheel, the overlying hopper, the chamber therein, the rotatable transfer device mounted in said hopper above the pocketed feed-wheel and adapted to enter said chamber and transfer the contents thereof to said hopper, the gearing between said device and the carrying-wheels, and means for throwing said gearing into and out of action.

22. The combination, with the supporting-frame and its carrying-wheels, of the pocketed feed-wheel, the overlying hopper, the chamber therein, the rotatable transfer device mounted in said hopper above the pocketed feed-wheel and adapted to enter said chamber and transfer the contents thereof to said hopper, the gearing between said device and the carrying-wheels, the furrow opener and coverer, devices for throwing them into and out of action, and means coacting with said devices for throwing said gearing into and out of action.

23. The combination with the supporting-frame and its carrying-wheels, of the supply-hopper, the cutter-box, the cutter-head, and means for actuating said head, of an endless conveyer between said hopper and box, gearing between said conveyer and the carrying-wheels, and means for throwing said gearing into and out of action.

24. The combination, with the supporting-frame and its carrying-wheels, of the pocketed feed-wheel, the hopper adjacent thereto, the chamber in said hopper, the rotatable transfer devices in said hopper adapted to enter said chamber, cutter mechanism, communicating with said chamber, the fertilizer-box, the feed-wheel therein, gearing between said wheel and the carrying-wheels, and means for throwing said gearing into and out of action.

In testimony whereof I have hereunto affixed my signature in the presence of two subscribing witnesses.

WESLEY O'NEILL.

Witnesses:
ELLIS I. O'NEILL,
DAVID J. MURDAL.